Figure 1:
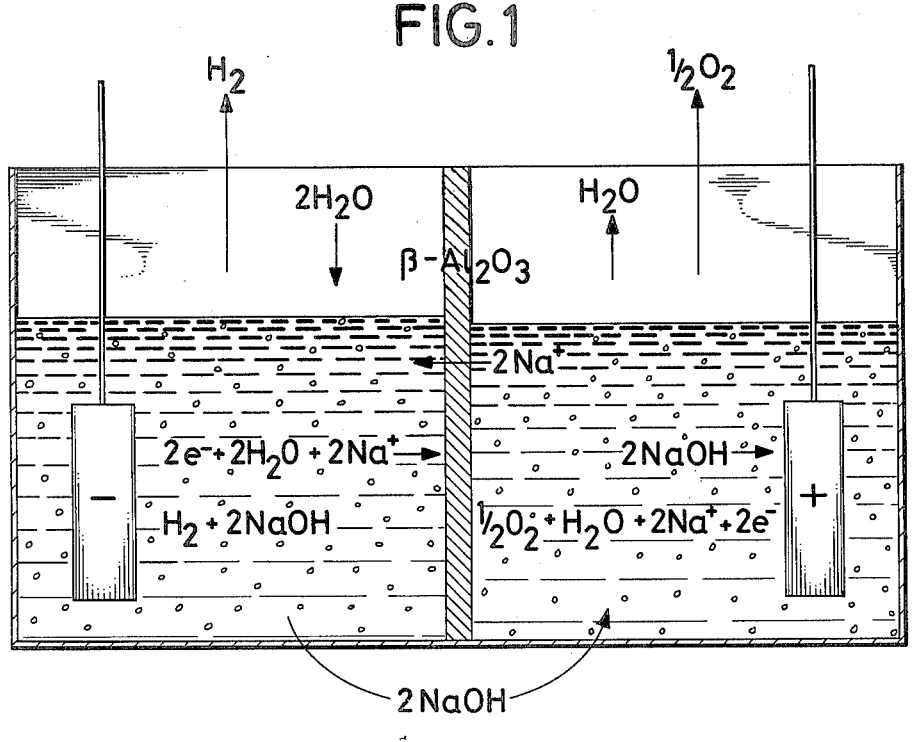

United States Patent [19]

Divisek et al.

[11] 4,225,401

[45] Sep. 30, 1980

[54] METHOD FOR GENERATING HYDROGEN AND OXYGEN

[75] Inventors: Jiri Divisek; Jürgen Mergel, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 972,334

[22] Filed: Dec. 22, 1978

[51] Int. Cl.² ............................ C25B 1/04; C25B 1/10
[52] U.S. Cl. ..................................... 204/129; 204/295
[58] Field of Search .............................. 204/129, 295

[56] References Cited

U.S. PATENT DOCUMENTS

| 1,543,357 | 6/1925 | Baur | 204/129 |
| 3,719,531 | 3/1973 | Dziecluch et al. | 204/295 |
| 3,725,236 | 4/1973 | Johnson | 204/129 |

Primary Examiner—R. L. Andrews
Attorney, Agent, or Firm—Becker & Becker, Inc.

[57] ABSTRACT

Method and apparatus for generating hydrogen and oxygen. Water is electrolytically decomposed in an electrolysis cell having a molten electrolyte which contains alkali ions and has a high $OH^-$ ion activity. The anode and cathode chambers are separated from one another by a separator made of an ion conducting aluminum oxide modification known as $\beta$-$Al_2O_3$. Hydrogen and oxygen are then separately withdrawn.

7 Claims, 2 Drawing Figures

METHOD FOR GENERATING HYDROGEN AND OXYGEN

The present invention relates to a method of generating hydrogen and oxygen by electrolytic decomposition of water in an electrolysis cell having a liquid or molten electrolyte which contains alkali ions and has a high $OH^-$ ion activity. According to this method, hydrogen and oxygen are separately withdrawn. The present invention also relates to an apparatus for carrying out this method.

The generation of hydrogen will acquire increased attention because hydrogen, as a future energy source, will probably acquire a great economic significance. Furthermore, in this connection, insofar as thermal energy must be supplied, the energy of solar radiation and also of energy obtained in nuclear reactors can be taken advantage of.

A number of methods of obtaining hydrogen from water are known. However, the vast majority of these method have not advanced beyond the experimental stage. Up to now, only one method was knwon which had industrial application. According to this heretofore known method, hydrogen and oxygen are generated by electrolysis using as electrolyte an aqueous solution of about 25% by weight potassium hydroxide. This knwon method is carried out at a temperature of between 70° and 90° C. The material for the necessary electrolysis cell and for the cathode is steel, and for the anode is nickel-plated iron. However, this known method has the drawback that it has a very high energy consumption. At a current density of between 100–200 mA/cm$^2$, this energy consumption averages 4.6 kWh/Nm$^3$H$_2$; under most favorable conditions, 4.2 kWh/Nm$^3$H$_2$ (see A. Schmidt "Angewandte Elektrochemie", Verlag Chemie, Weinheim, 1976, Page 126).

An attempt has already been made to reduce the energy consumption during the generation of hydrogen by carrying out the electrolysis at increased pressure, although the decomposition potential increases with increasing gas pressure. An advantage of this measure consists in that the increase in the potential is counteracted in that the gas bubbles formed in the electrolyte have a considerably smaller volume as a result of the increase in pressure, so that the electrolytic resistance, and thereby the potential of the cell, decrease (see A. Schmidt "Angewandte Elektrochemie", Verlag Chemie, Weinheim, 1976, Page 127). A drawback of this measure, however, consists in that the expenditures for the apparatus used for the electrolysis are considerably increased.

According to another heretofore known method, pure water is decomposed using a solid electrolyte such as sulfonated polytetrafluoroethylene, which is abbreviated PTFE (see L. J. Nutall, A. P. Fickett, and W. A. Titterington, "Hydrogen Generation by Solid Polymer Electrolyte Water Electrolysis", Proc. Energy Conf., Miami, 1974, S9-33 to S9-37). This method does, in fact, have the advantage of eliminating the use of the diaphragm, to separate hydrogen and oxygen, which with the previously known methods was considered expedient. This method also has the advantage that pure water can be used, so that corrosion effects are precluded. Nonetheless, this method has an important drawback; namely, that platinum must be used as electrode material. This use of platinum for all practical purposes excludes application on an industrial scale.

Due to the unsatisfactory results of the heretofore known methods of obtaining hydrogen and oxygen, it had also been proposed, in a reversal of the process, in $H_2$-$O_2$ fuel cells to obtain hydrogen and oxygen using a 25% potassium hydroxide solution at a working temperature of 80° C. In this connection, an electrode made of hot pressed nickel carbonyl is used as a cathode of high porosity.

The two electrolysis chambers required for carrying out the electrolysis were separated by a diaphragm of asbestos paper (H. Ewe "Chemie-Ingenieur-Technik", MS 322/76). To improve this method, it has also been previously proposed to make the cathode, and beyond that, also the anode, out of Raney nickel in order to thereby achieve an activation. As a result of this measure, the cell potential was in fact reduced by 20%. However, the drawback of this measure is that the manufacturing process for Raney nickel electrodes is very expensive. Moreover, the energy consumption necessary for carrying out this method is also still high.

According to another proposed method for economically obtaining hydrogen and oxygen, the energy released from a high-temperature reactor is used to generate a water vapor phase having a temperature of about 1000° C., and the water vapor is decomposed by means of a solid electrolyte of $ZrO_2$ (see W. Dönitz "Chemie-Ingenieur-Technik", MS 323/76, and W. Baukal, M. Döbrich, and W. Kuhn "Chemie-Ingenieur-Technik", Volume 48, 1976, No. 2, Page 132). This method has the advantage that the use of a solid electrolyte results in considerable thermodynamic and kinetic advantages, including: the stabilized $ZrO_2$ used in this method as electrolyte simultaneously conducts oxygen ions; the electrolyte, which on both sides is in contact with porous electrodes, at the same time separates both gas chambers. However, a drawback of this method consists in that to carry out the method, the water vapor must be brought to a temperature of at least 900° C., at which the solid electrolyte has sufficient electrical conductivity. Therefore, an electrical decomposition only takes place at temperatures above 900° C. Due to these high temperatures, which are necessary for carrying out this method, use on an industrial scale is not yet known, or at most is only possible to a limited extent.

It is therefore an object of the present invention to provide a method, and an apparatus for carrying out this method, by means of which it is possible to obtain hydrogen and oxygen under economical conditions, so that it is possible to use the method of the present invention on a large industrial scale. In particular, it is an object of the present invention to considerably reduce the necessary consumption of electrical energy as compared to the heretofore known methods. Furthermore, a method of the present invention should be capable of being carried out at temperatures which make it possible to supply thermal energy in a relatively simple manner. Finally, the materials provided for carrying out the reactions which occur during the method should practically preclude environmental danger or pollution.

Figure 2:
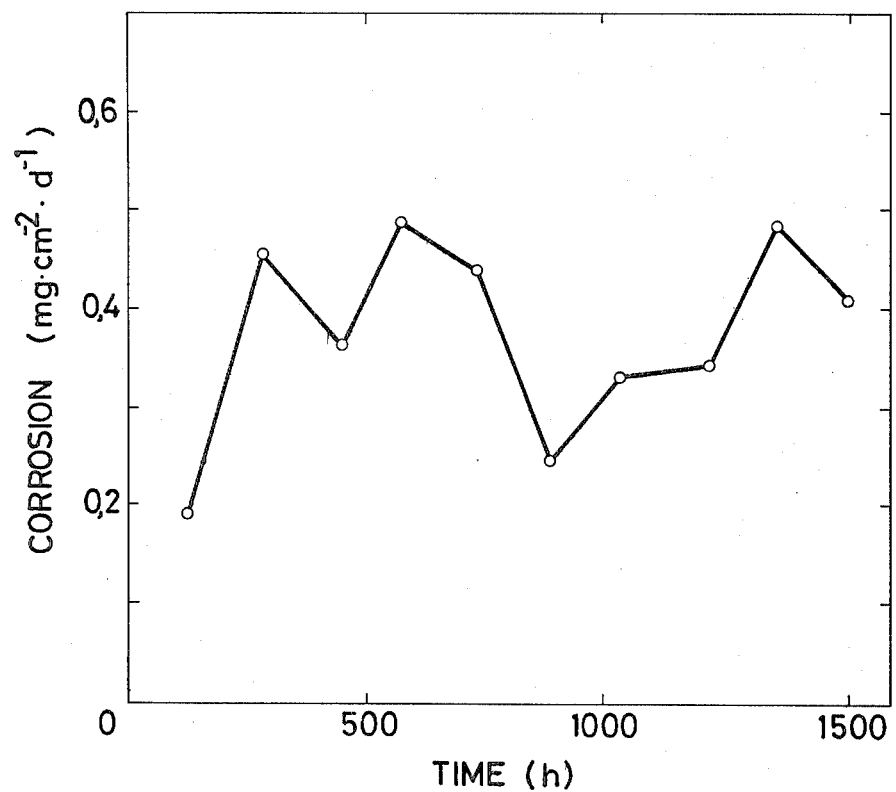

These and other objects and advantages of the present invention will appear more clearly from the following specification in connection with the accompanying drawings, in which:

FIG. 1 is a schematic diagram explaining the operation of the water decomposition of the present invention; and FIG. 2 is a graph illustrating the weight loss or corrosion of the separator under working conditions.

The object of the present invention is basically solved by electrolytic decomposition of water which has been introduced as steam or vapor into an $OH^-$ ion containing melt, especially an alkali ion containing melt, as described in U.S. Pat. No. 1,543,357. However, the conditions stated in this patent do not lead to a technically usable generation of hydrogen. In particular, the stated separation of the anode and cathode chambers by bell jars or by a more or less great spacious distance doesn't strictly prevent the diffusion of gases, so that as a result of gas back-diffusions, economic losses occur which these days are no longer acceptable. The considerable spacious separation of the cathode and anode required by the heretofore known methods results in too great of potential losses within the cell. These losses, for all practical purposes, cancel the competitiveness of these methods. Moreover, the electrolytic efficiency is greatly impeded if peroxide compounds formed at the anode can pass unhindered to the cathode, as is readily possible pursuant to the above mentioned U.S. Patent. The approximately 10% decreased yield caused as a result thereof is no longer economically acceptable.

A strict separation of the anode and cathode chambers could of course be provided by remedial measures. However, it is difficult to find separators which are durable and usable in the hot alkali melt. At the laboratory scale, corundum diaphragms are known. However, these diaphragms are totally unsuitable for industrial use on a large scale, since on the one hand they entail a very high resistance in the electrolysis cell, and on the other hand, because large surfaced separators are extremely difficult to manufacture.

The method of the present invention, by means of which a technically satisfactory electrolytic decomposition of water in an electrolysis cell is achieved with a molten electrolyte, is characterized primarily in that the anode chamber and the cathode chamber are separated from one another by a separator made of an ion conducting aluminum oxide modification known as $\beta$-$Al_2O_3$.

Referring now to the drawings in detail, FIG. 1 shows how the $\beta$-$Al_2O_3$ membrane only allows alkali ions to pass through, while oxygen and hydrogen remain separated in the respective electrode chambers, from where they can be separately withdrawn. To equalize the mass balance, a transfer of electrolyte from the cathode chamber to the anode chamber takes place. This transfer is realized in such a way that a carrying along of gases is precluded.

The separation of the anode chamber and the cathode chamber by means of a $\beta$-$Al_2O_3$ separator pursuant to the present invention has, in addition to the already mentioned advantage of achieving a complete gas separation, the advantage that the entire cell potential can be reduced, since, according to the present invention, distances between the electrodes which merely correspond to the thickness of the separator are possible, in other words, for all practical purposes, this distance may amount to about 1-3 mm. In this connection, the specific electrical resistance can be even lower than that of the melt. Moreover, pursuant to the present invention, an electrolytic efficiency of practically 100% is achieved, since a crossing of peroxide compounds formed at the anode into the cathode chamber is prevented.

The electrolysis of the present invention preferably takes place at temperatures of from 300° to 600° C.

Suitable electrolytes are salts or salt mixtures having an $OH^-$ ion activity and a melting point below 800° C., especially in the range of 300°-600° C. Preferably at least one of the salts is formed by an alkali hydroxide, especially sodium hydroxide. Thus, suitable electrolytes include sodium hydroxide itself, or mixtures of sodium hydroxide with other alkali hydroxides and/or alkali salts, especially sodium salts such as fluorides, sulfates, or carbonates. It is particularly expedient to add lithium hydroxide, which reduces the water content of the gaseous products and retards the formation of peroxides. Potassium hydroxide appears to be less suitable.

A slightly hygroscopic quality of the electrolyte has the advantage that the escape of undecomposed water vapor together with the gaseous products is reduced. Preferably, the electrolyte should therefore contain a compound which is hygroscopic at the operating temperature. Customary water contents of the electrolytic melt are in the range of about 0.5-4%.

The $\beta$-$Al_2O_3$ separator provided pursuant to the present invention shows an unexpectedly good durability in melts of the above described type. This surprising durability was demonstrated by corrosion tests conducted over a long period of time. The results are shown in FIG. 2, from which it can be seen that only a very small, practically constant rate of corrosive usage of the separator results. The data was recorded at 410° C. in liquid sodium hydroxide with 0.5% water.

An advantage of the method of the present invention consists in that as a result of the high $OH^-$ ion activity of the electrolyte, and the relatively high temperature at which the method is carried out, the electrochemical water vapor dissociation is very favored both thermodynamically and kinetically. It may be expedient to introduce the water vapor through or into the melt at a pressure above normal pressure.

Nickel is a very suitable material for the cathode and anode. However, it can also be very advantageous to use graphite for the cathode, and nickel for the anode.

For a particularly advantageous supply of water vapor, a suitable cathode is one which is formed as a hollow body, through which the water vapor is supplied.

The current density can be improved by using a porous cathode or porous cathode and anode. Pursuant to a preferred embodiment of the present invention, porous electrodes can be brought into direct contact with those surfaces of the separator which face away from one another.

If sodium hydroxide is used as the salt melt, it has been shown to be expedient to use nickel or nickel-plated iron for the cell which is provided for receiving the electrolyte.

EXAMPLE 1

Water vapor at normal pressure was electrolyzed in a NaOH melt at 430° C. The water vapor was introduced into the melt through a porous graphite electrode with fixed active carbon. A nickel grid served as the anode. To separate $H_2$ and $O_2$, a ceramic membrane of $\beta$-$Al_2O_3$ solid electrolyte was used. The separation wall, at the operating temperature, had a specific resistance of about 0.1 $\Omega$cm. This value is, in comparison to the specific electrical resistance of the NaOH melt of about 0.45 $\Omega$cm, practically negligible. This was confirmed by an additional measurement.

An $\alpha$-$Al_2O_3$ crucible was used as the electrolysis cell. A nickel crucible can also be used. Hydrogen was generated at the cathode, and oxygen at the anode. The nickel anode became covered with a protective layer of nickel oxide. The corrosion of the anode was negligibly small during the course of the test, and was measured as practically zero.

To remove the moisture, the NaOH melt was rinsed prior to th electrolysis for three hours with 99.99% argon. The measured residual current density, which corresponds to the residual moisture, was 10 mA/cm$^2$ at 1250 mV cell potential, and 25 mA/cm$^2$ at 1400 mV cell potential. After introducing water vapor, the measured current density was 200 mA/cm$^2$ at 1250 mV cell potential, and 400 mA/cm$^2$ at 1400 mV cell potential. At the operating temperature of 430° C., the decomposition potential of NaOH was 2.272 V.

EXAMPLE 2

Water vapor at normal, standard or atmospheric pressure was electrolyzed in a NaOH melt at 400° C. A nickel sheet was used as electrode material not only for the anode, but also for the cathode. The water vapor was introduced into the melt through a separate vapor line in the vicinity of the cathode. The quantities of hydrogen and oxygen produced by the electrolysis were analyzed by gas chromatography. From these values, the electrolysis efficiency was computed. During the electrolysis carried out first without separating the two electrode chambers, the electrolysis efficiency was 90% of the theoretical value. Thereafter, an electrolysis was carried out under the same conditions with the same cell geometry, but with the electrode chambers separated by a $\beta$-Al$_2$O$_3$ separator. The electrolysis efficiency, which was measured as above, was now 98–99% of the theoretical value.

In the gaseous product of the electrolysis cell, a current density dependent molar ratio of 20:1 (H$_2$O:H$_2$) was measured at 400 mA/cm$^2$.

EXAMPLE 3

Water vapor at normal pressure was electrolyzed in a hydroxide melt having the composition NaOH:LiOH=1:1. The construction and dimensions of the cell were the same as those for Example 2.

In the gaseous products of the electrolysis cell, a molar ratio of H$_2$O:H$_2$ of 8:1 was measured at a current density of 400 mA/cm$^2$. In other words, under the conditions of this example, the water content of the gaseous products was sharply reduced.

In this example, the electrolysis efficiency, which was measured as in Example 2, was practically 100% of the theoretical value, that is, it was even further improved.

In order to even more clearly show the electrolysis efficiency improvement achieved by changing the electrolyte, the electrolyte efficiency was determined without a separator under the same conditions. In this instance, the efficiency was 96% as compared to 90% under the same conditions but with the electrolyte of Example 2. In the latter case, that is without using the separator, the gas separation was of course worsened.

The present invention is, of course, in no way restricted to the specific disclosure of the drawings, but also encompasses any modifications within the scope of the appended claims.

What we claim is:

1. A method of generating hydrogen and oxygen by electrolytic decomposition of water in an electrolysis cell having an anode chamber and a cathode chamber provided with electrodes for applying a decomposition voltage, which method comprises in combination the steps of:
   adding to said cell a molten alkali ion containing electrolyte having a high OH$^-$ ion activity;
   introducing water to said cell;
   separating said anode and cathode chambers by an ion conducting aluminum oxide modification known as $\beta$-Al$_2$O$_3$,
   applying an electrolysis current, and
   separately withdrawing hydrogen and oxygen from said cathode and anode chambers respectively.

2. A method in combination according to claim 1, in which said electrolyte is selected from the group consisting of an alkali hydroxide and a mixture of alkali hydroxides.

3. A method in combination according to claim 2, in which said electrolyte also comprises at least one alkali salt.

4. A method in combination according to claim 2, in which said electrolyte is selected from the group consisting of sodium hydroxide and a mixture of lithium hydroxide and sodium hydroxide.

5. A method in combination according to claim 1, which includes the step of carrying out said electrolysis at 300° to 600° C.

6. A method in combination according to claim 1, in which said electrolyte contains at least one compound which is hygroscopic at operating temperature.

7. A method in combination according to claim 1, which includes the step of introducing said water to the electrolyte melt as water vapor and at above atmospheric pressure.

* * * * *